Aug. 27, 1929.  E. P. SEGHERS  1,726,367
TRAP
Filed June 14, 1926   5 Sheets-Sheet 1
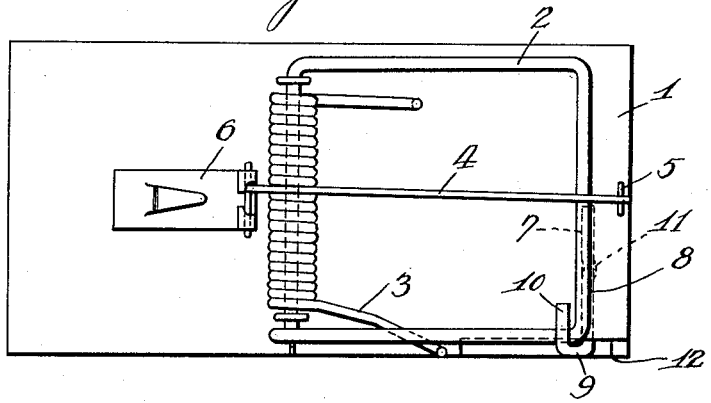
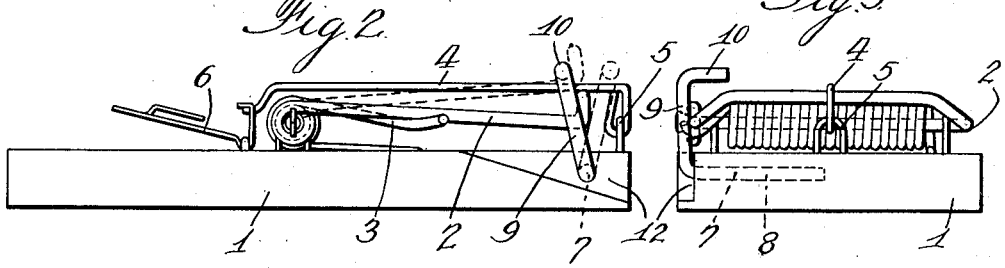
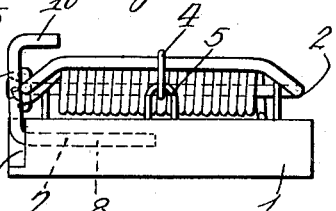
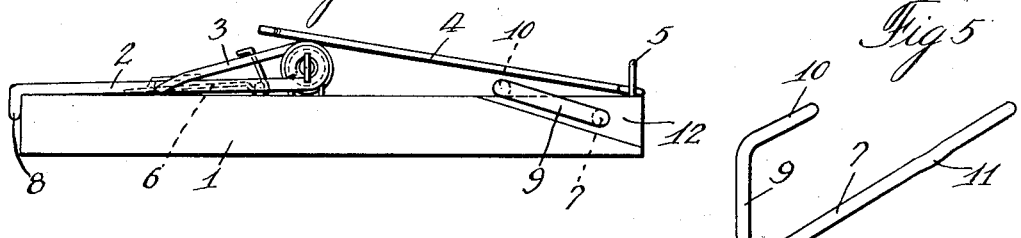
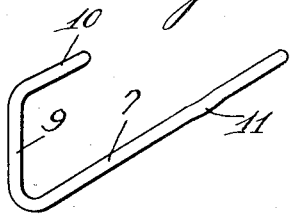
Inventor:
Emiel P. Seghers
By Nissen & Crane
Attys Aug. 27, 1929. E. P. SEGHERS 1,726,367
TRAP
Filed June 14, 1926 5 Sheets-Sheet 2
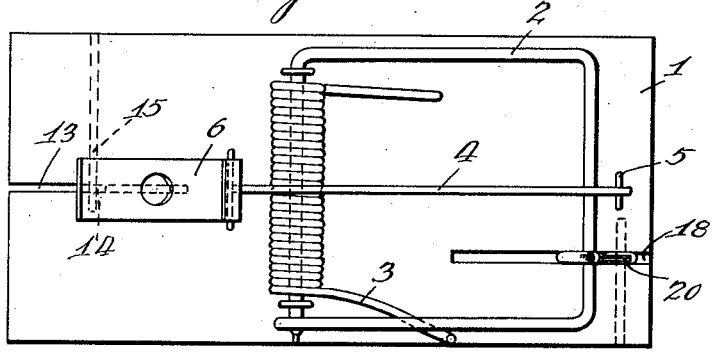
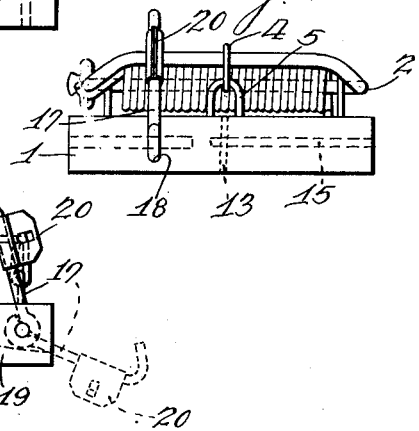
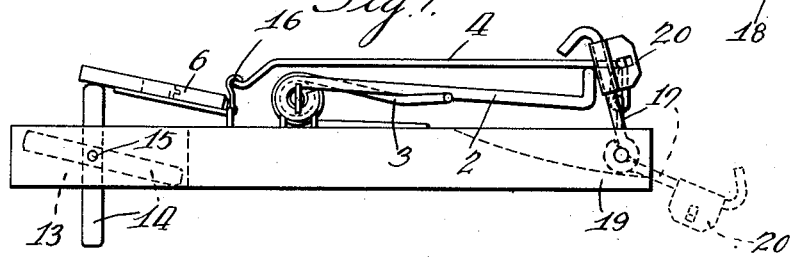
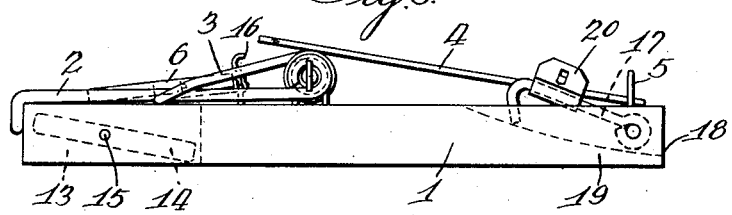
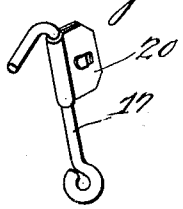
Inventor:
Emiel P. Seghers
By: Nissen & Crane
Attys.

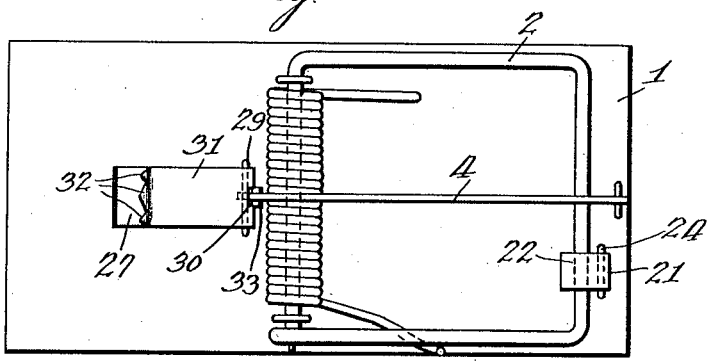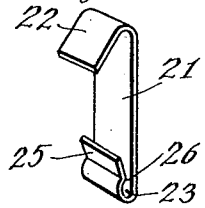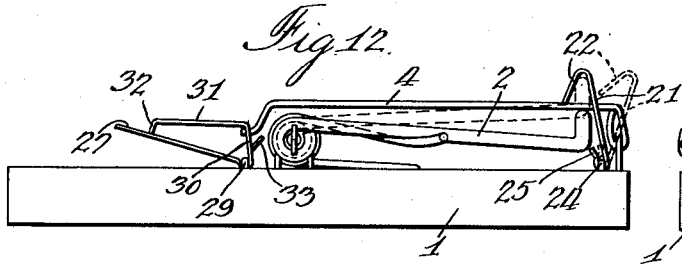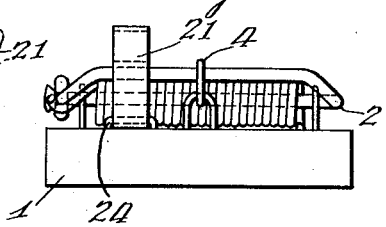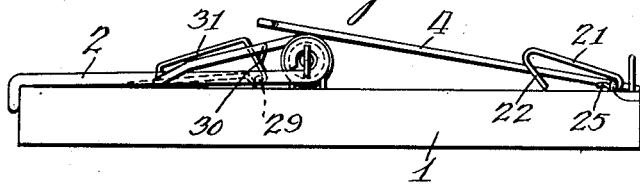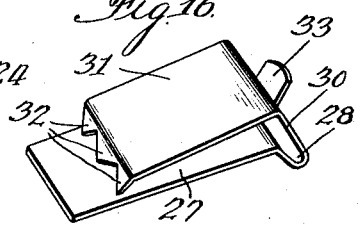

Aug. 27, 1929.     E. P. SEGHERS     1,726,367
TRAP
Filed June 14, 1926     5 Sheets-Sheet 4
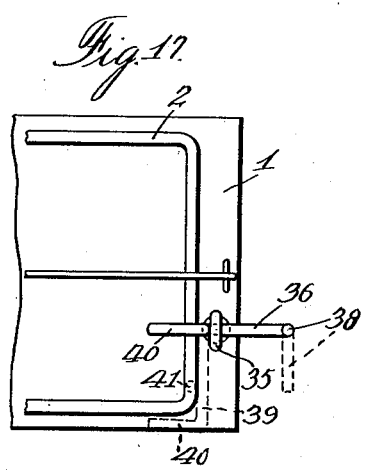
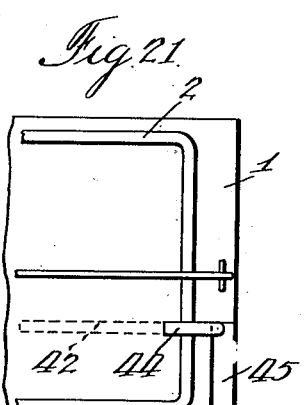
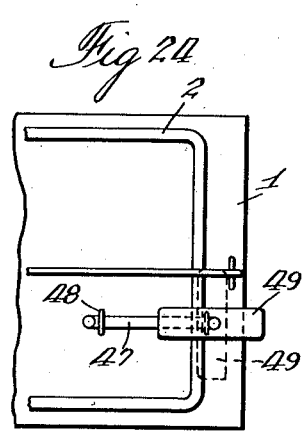
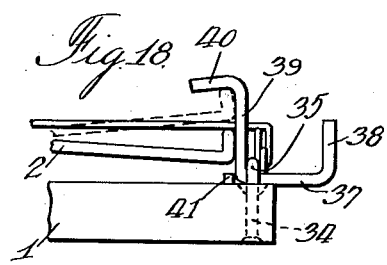
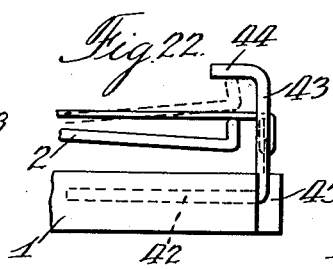
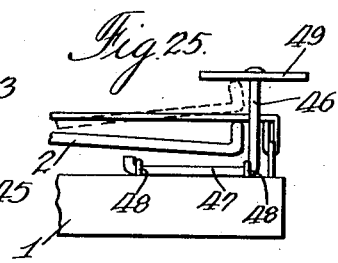
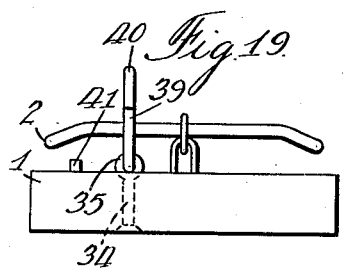
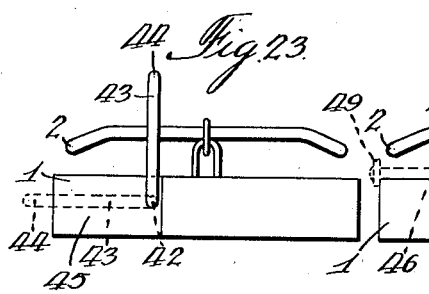
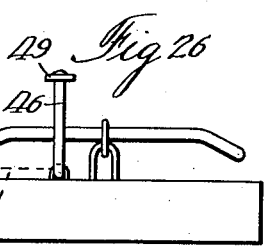
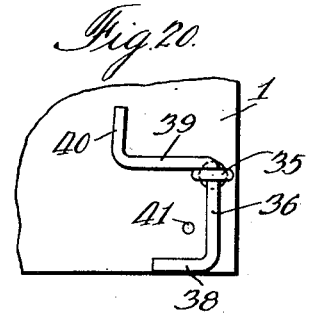
Inventor:
Emiel P. Seghers
By Nissen & Crane
Attys Aug. 27, 1929.  E. P. SEGHERS  1,726,367
TRAP
Filed June 14, 1926   5 Sheets-Sheet 5
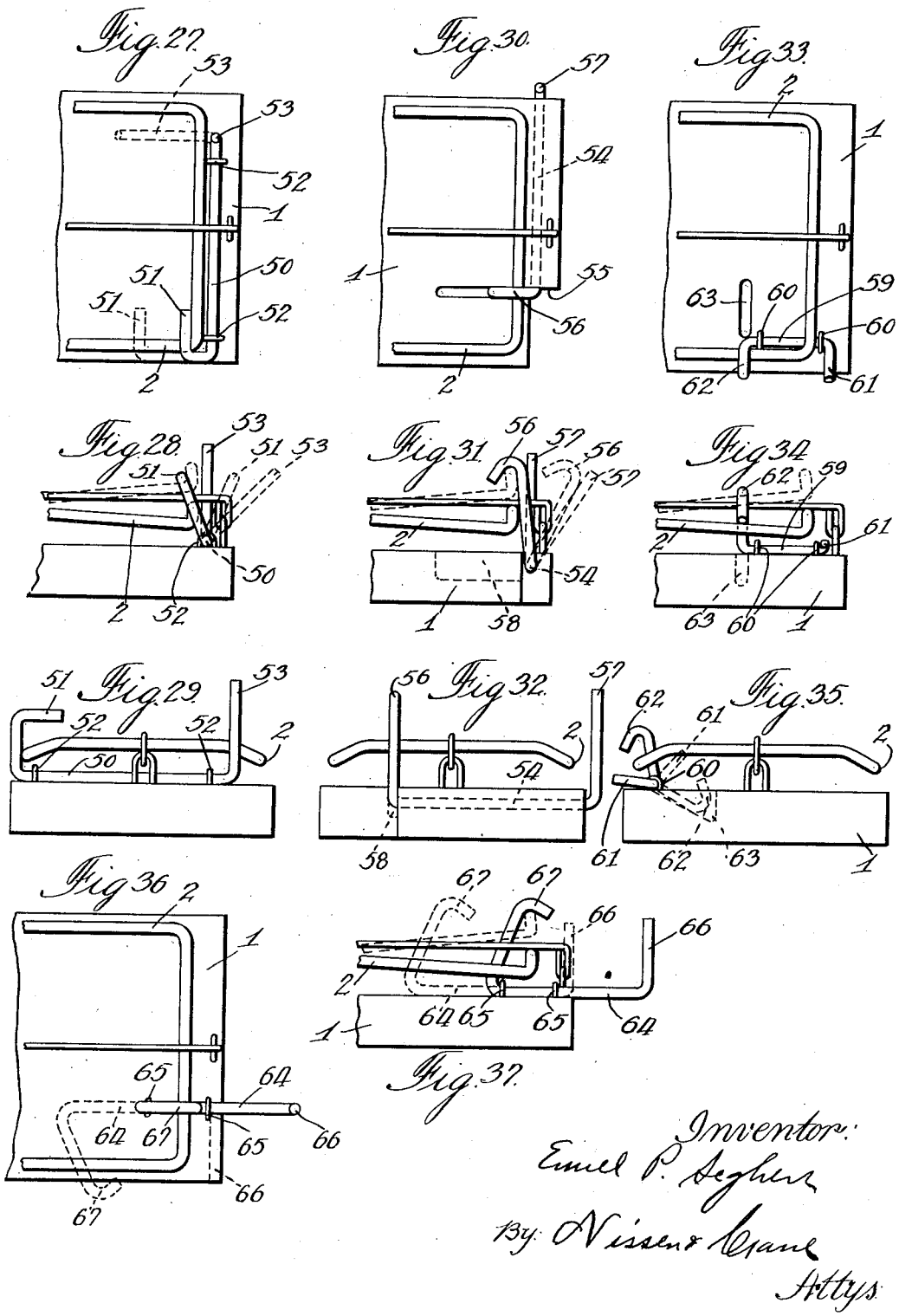

Patented Aug. 27, 1929.

1,726,367

UNITED STATES PATENT OFFICE.

EMIEL P. SEGHERS, OF CHICAGO, ILLINOIS.

TRAP.

Application filed June 14, 1926. Serial No. 115,717.

This invention relates to traps for rodents or other animals and has for its object the provision of devices of the class named which shall be economical to manufacture, convenient and safe to set, and efficient in operation.

The invention is exemplified in the combination and arrangement of parts shown in the accompanying drawings and described in the following specification, and it is more particularly pointed out in the appended claims.

In the drawings:—

Fig. 1 is a plan view of a trap showing one embodiment of the present invention applied thereto.

Fig. 2 is a side elevation of the trap shown in Fig. 1.

Fig. 3 is an end view of Fig. 2.

Fig. 4 is a side elevation of the trap shown in Fig. 1 with the parts folded into position for shipping.

Fig. 5 is a perspective view of the safety catch forming a part of the trap.

Figs. 6, 7, 8, 9 and 10 are views similar to Figs. 1, 2, 3, 4, and 5, respectively, but showing a different modification of the invention.

Figs. 11, 12, 13, 14 and 15 are views similar to Figs. 1 to 5, inclusive, respectively, showing still another modification.

Fig. 16 is a perspective view of the bait holder used in the trap shown in Figs. 11 to 13, inclusive.

Figs. 17, 18 and 19 are fragmentary plan side and end elevations respectively of a portion of a trap showing a modified form of safety catch.

Fig. 20 is a view similar to Fig. 17 showing the safety catch in its folded position for shipping.

Figs. 21, 22 and 23 are views similar to Figs. 17, 18 and 19, respectively, but showing a different form of safety catch.

Figs. 24, 25 and 26 are views similar to Figs. 17, 18 and 19, respectively, showing another form of safety catch.

Figs. 27, 28 and 29 are views similar to Figs. 17, 18 and 19, showing another form of safety catch.

Figs. 30, 31 and 32 are views similar to Figs. 17, 18 and 19, respectively, showing another form of safety catch.

Figs. 33, 34 and 35 are views similar to Figs. 17, 18 and 19, respectively showing another form of safety catch.

Fig. 36 is a top plan view showing a different form of safety catch.

Fig. 37 is an elevation of the device shown in Fig. 36.

Referring first to Figs. 1 to 5, inclusive, the numeral 1 designates the base block of a trap having a jaw or fall 2 pivotally mounted thereon and provided with a spring member 3 tending to close the jaw against the left hand end of the base block as shown in Fig. 1. A rod 4 is secured to the base 1 by a staple 5 and engages a trigger member 6 to hold the jaw 2 in set position. A safety catch 7 comprising a wire, bent in the form shown in Fig. 5, is provided for preventing accidental springing of the jaw while the trap is being set. One arm of the wire 7 is inserted in a perforation 8 of the base 1 and forms a pivot about which the part 9 may be swung to bring the portion 10 into and out of position above the jaw 2. The portion of the catch inserted in the block 1 may be slightly bent, as indicated at 11, to insure a close fit so that the catch will be frictionally held by contact with the wood in any position of adjustment to which it is rotated. It will be apparent that when the safety catch is moved to the broken line position shown in Fig. 2, the jaw may be opened and the catch moved forwardly above the jaw into the full line position shown in that figure by a slight forward pressure on the rear of the catch. This places the catch in its operative position so that in case of accidental release of the jaw, it will be intercepted by the portion 10 to prevent accidental springing of the jaw and arrest the jaw in the broken line position shown in Fig. 2. The jaw may be folded downwardly against the upper face of the block 1 as shown in Fig. 4 so that it will not interfere with packing of the traps for shipment. The edge of the block 1 is preferably cut away, as shown at 12, to accommodate the portion 9 of the safety catch so that the safety catch will not project laterally beyond the edge of the block. This also is for purposes of economy of space in packing for shipment. After the trap has been set, the safety catch is swung backwardly into the broken line position shown in Fig. 2, or even further backwardly so that it will not interfere with springing of the trap. It will be seen from Figs. 2 and 3 of the drawings that when the jaw is open and held by the retaining leg 10 of the safety catch 9, as shown in broken lines in Fig. 2, that the safety catch will be positively prevented from displacement because of the fact that the leg 10 engages the angularly disposed end portion of the cross-bar 8, thus positively preventing the safety catch from swinging backwardly out of engagement with the jaw.

In the form of the invention shown in Figs. 6 to 10, inclusive, the base block 1 is provided with a slot 13 in which a detent bar 14 is secured to rotate about a pivot 15. The bar 14 rotates freely upon its pivot in the slot 13. In setting a trap provided with this device, the trigger 6 is raised and the bar 14 rotated into the position shown in Fig. 7 to hold the trigger in its raised position. The jaw 2 is then opened and the bar 4 is swung laterally beneath the hook portion 16 of the trigger 6. It will be apparent that it will be impossible to spring the trap as long as the bar 14 is in its upright position. The trap may be held by the rear portion of the block 1 and placed upon the surface where the trap is to be set. A slight forward push on the block 1 will cause the bar 14 to rotate into the slot 13 in the position shown in broken lines in Fig. 7 so that the trap is ready to be sprung. It will be seen that the bar 14 holds the trap against accidental closing from the time the bar 4 is placed beneath the hook 16 until the trap is in place upon the surface where it is to be set. In setting the trap, it is unnecessary for the operator to place his fingers on the trigger 6 or in the path of the jaw since the trigger is raised prior to opening the jaw, and all that is necessary to set the trap is to swing the bar 14 laterally beneath the hook 16.

As a further safety device, the trap may be equipped with a safety hook 17 pivoted in a slot 18 formed in the top of the block 1. The lower end of the hook 17 is provided with an eye having a driving fit on a pivot pin which is frictionally held in a perforation in the base 19 to hold the hook in its positions of adjustment. It is noted that the slot is cut only partially through the block leaving a web at 19 to hold the slot from springing open or closed due to warping or swelling of the block. A finger piece 20 is provided for moving the hook into and out of operative position.

In the form of the invention shown in Figs. 11 to 16, inclusive, a safety catch 21 is formed from a strip of sheet metal having a hook 22 at its upper end and an eye 23 at its lower end for engaging a staple 24. The eye 23 is preferably partially closed by a spring tongue 25 having a rib 26 thereon which may be snapped into position beneath the staple 24. The staple 24 is driven sufficiently tight to produce friction between the block 1 and the safety catch to retain the catch in various positions of adjustment, as indicated in broken lines in Fig. 12. The trigger 27 is formed of a single strip of sheet metal bent to provide a groove 28 for receiving the staple 29. The strip of metal continues upwardly, as shown at 30, and is bent forwardly, as shown at 31, and provided with downwardly extending teeth 32 arranged to bear on the upper face of the lower portion of the strip. This provides a spring jaw for holding the bait in the trigger. The upright portion 30 is punched to provide an opening therethrough for the end of the holding rod 4. The punched out portion is not severed at the bottom but is bent backwardly, as shown at 33, to provide an inclined tongue. In setting the trap, the downwardly bent portion of the rod 4 is pressed against the inclined tongue 33 to raise the trigger into its set position. The holding rod 4 may then be moved to one side or the other of the opening to retain the trigger in its uppermost position and raised along the side of the opening until it catches beneath the top edge of the opening. In this way, the trigger is raised to its set position without the necessity of touching it with the fingers.

In the form of the invention shown in Figs. 17, 18, 19 and 20, a swivel pin 34 extends through the base block 1 and is provided with an eye 35 at its upper end. A safety catch 36 is provided with a horizontally extending arm 37 having a finger piece 38 and an upright arm 39. A retainer 40 is carried at the upper end of the arm 39. The safety device is shown in its operative position in Figs. 17 and 18. After the trap has been set, the finger piece 38 may be swung laterally to move the retainer 40 into the broken line position shown in Fig. 17 so that it will not interfere with the operation of the trap. The catch may also be turned upon its swivel 34 to an inoperative position. When the trap is packed for shipment, the device may be pivoted about its swivel pin 34 and laid flat upon the base 1, as shown in Fig. 20. A stop pin 41 may be provided for limiting the swivelling movement of the catch. The eye 35 preferably fits tightly on the arm 37 and the swivel fits tightly in its opening so that the parts will remain in any position in which they are set.

In the form of the invention shown in Figs. 21, 22 and 23, the block 1 is perforated longitudinally at 42 to receive the lower arm of the U-shaped safety catch 43. The upper arm 44 is shorter than the lower arm and serves as a retainer for intercepting the jaw 2. The lower arm fits tightly in the perforation in the base 1 so that the safety hook will remain in its different positions of adjustment. After the trap has been set, the hook is swung to the broken line position shown in Fig. 23. The block 1 may be cut away as shown at 45 so that the catch need not project beyond the edge of the block.

In the form of the invention shown in Figs. 24, 25, and 26, the safety catch comprises a rod or wire 46 having one arm 47 secured to the top of the block 1 by staples 48 driven sufficiently tight to hold the catch in its positions of adjustment. A bar 49 is swiveled on the end of the upright portion 46 and may be rotated into and out of position to intercept the jaw 2. The device may be swung to broken line position shown in Fig. 26 for packing.

In the form of the invention shown in Figs. 27, 28 and 29, the rod or wire 50 is bent at one end to form a retainer 51 which may be swung into the full line position shown in Fig. 28 to intercept the jaw 2 and swung into broken line position shown in that figure to leave the jaw free for operation. The rod 50 is held in place by staples 52 which are driven sufficiently tight to hold the catch in its different positions of adjustment. A portion of the rod 50 is bent at right angles to form a handle 53 at the end opposite the retainer 51. The retainer 51 and handle 53 may be swung to broken line position shown in Fig. 27 for packing.

In the form of the invention shown in Figs. 30, 31 and 32, a rod 54 is inserted in a transverse perforation in the block 1, the block being cut away at 55 to permit the end of the wire to be bent upwardly to form a retainer hook 56. The opposite end of the wire is bent to form a handle 57. The wire fits tightly in the perforation so that the hook will remain in different positions of adjustment. The top of the block 1 is preferably provided with a depression 58 to receive the catch 56 when the parts are compacted for shipping.

In the form of the invention shown in Figs. 33, 34 and 35, the rod 59 is secured to the top of the block 1 by staples 60 driven sufficiently tight to hold the rod in different positions of rotation. One end of the rod 59 is bent laterally to provide a finger piece 61 while the other end of the rod is bent into the form of a safety catch 62 movable into position to intercept the side bar of the jaw 2. The block 1 is preferably provided with a depression 63 for receiving the hook 62 to permit it to fold closely against the block for packing.

In the form of the invention shown in Figs. 36 and 37, a wire or rod 64 is attached to the upper face of the block 1 by staples 65 which are driven sufficiently tight to hold the rod against accidental rotation. A handle piece 66 is formed at one end of the rod 64 and a retainer 67 is formed at the opposite end. The rod 64 is slid longitudinally to move the hook into and out of position to intercept the jaw 2. The device may be rotated laterally against the face of the block as shown in broken lines for packing and shipment.

I claim:—

1. The combination with a trap having a base member, of a safety catch for said trap having a horizontally disposed swivel and an upright arm provided with a retainer movable about said swivel into and out of position to intercept the jaw of said trap.

2. The combination with a trap having a base portion, of a safety catch comprising a rod having a swivel arm extending in the direction of the plane of said base portion and frictionally swivelled thereon, said catch having an upright arm provided with a laterally extending portion movable about the swivel connection into and out of position to intercept the jaw of said trap.

3. The combination with a trap having a wood base provided with a perforation therein, of a safety catch comprising a rod having an arm thereon tightly fitting in said perforation, a portion disposed at an angle to said rod, a hook formed at the end of said angularly disposed portion and movable about the axis of said perforation into and out of the path of the jaw of said trap.

4. A trap comprising a wooden base block, a jaw pivotally mounted on said base block, a spring for closing said jaw, trigger mechanism for holding said jaw in set position, and a safety catch for preventing accidental closing of said jaw, said safety catch comprising a bar extending into a cylindrical opening in said base block, said bar being of a diameter to fit tightly in said opening so that the side walls of said opening frictionally engage the outer cylindrical surface of said bar to hold said bar in different positions of pivotal adjustment.

5. A trap comprising a wooden base block, a jaw pivotally mounted on said base block, a spring for closing said jaw, trigger mechanism for holding said jaw in set position, and a safety catch for preventing accidental closing of said jaw, said safety catch comprising a bar extending into a cylindrical opening in said base block, said bar being of a diameter to fit tightly in said opening so that the side walls of said opening frictionally engage the outer cylindrical surface of said bar to hold said bar in different positions of pivotal adjustment, said bar having a laterally projecting portion to augment the frictional resistance to turning of said bar in said opening.

6. A trap comprising a base block, a jaw pivoted to swing about a horizontal axis on said base block, said jaw comprising side arms connected at their ends by a cross-bar, trigger mechanism for holding said jaw in open position, and a safety catch for preventing accidental closing of said jaw, said safety catch comprising a member having substantially parallel legs connected by a yoke, one of said legs being pivotally mounted on said block adjacent the cross-bar of said jaw when said jaw is open while the other of said legs is movable about said first-named leg as a pivot to swing said movable leg into and out of position to intercept the movement of said jaw.

7. In a trap, a base block formed of wood, a jaw pivotally mounted on said base block, said block having a perforation therein extending substantially parallel to the pivotal axis of said jaw and disposed adjacent the extremity of said jaw when said jaw is open, and a safety catch having a leg extending into said perforation and frictionally held therein, said safety catch having a yoke extending adjacent one side of said jaw and having a second leg projecting from said yoke substantially parallel with said first leg and movable into and out of position to intercept said jaw.

8. In a trap, a base block, a jaw pivotally mounted on said block to swing about a horizontal axis, trigger mechanism for holding said jaw in set position, and a safety catch for preventing accidental closing of said jaw, said safety catch comprising a pair of substantially parallel legs connected by a yoke, one of said legs being pivotally mounted on said base block with said yoke positioned at one side of the path of movement of said jaw while the other of said legs is movable about the axis of said pivotally mounted leg into one position to intercept closing movement of said jaw and into another position in which said movable leg is disposed outside the path of movement of said jaw.

9. In a trap, a base block, a jaw pivotally mounted on said base block, said jaw comprising side arms and a cross-bar, said cross-bar having angularly disposed portions adjacent the end thereof for connecting said cross-bar to said side arms and for supporting said cross-bar at one side of the plane of said side arms, and a safety catch pivotally mounted on said block and having a yoke portion positioned at one side of the path of movement of said jaw and having a retaining leg extending toward said jaw in position to overlie one of said side arms but movable beyond the path of movement of said jaw, the angularly disposed portion of said cross-bar being arranged to intercept said retaining leg for preventing movement thereof out of engagement with said jaw when said jaw is held by said retaining leg.

In testimony whereof I have signed my name to this specification on this 12th day of June, A. D. 1926.

EMIEL P. SEGHERS.